Feb. 19, 1963 M. E. ULUG 3,077,858
APPARATUS FOR CONTROLLING AND MEASURING THE THICKNESS
OF THIN ELECTRICALLY CONDUCTIVE FILMS
Filed March 17, 1960 3 Sheets-Sheet 1
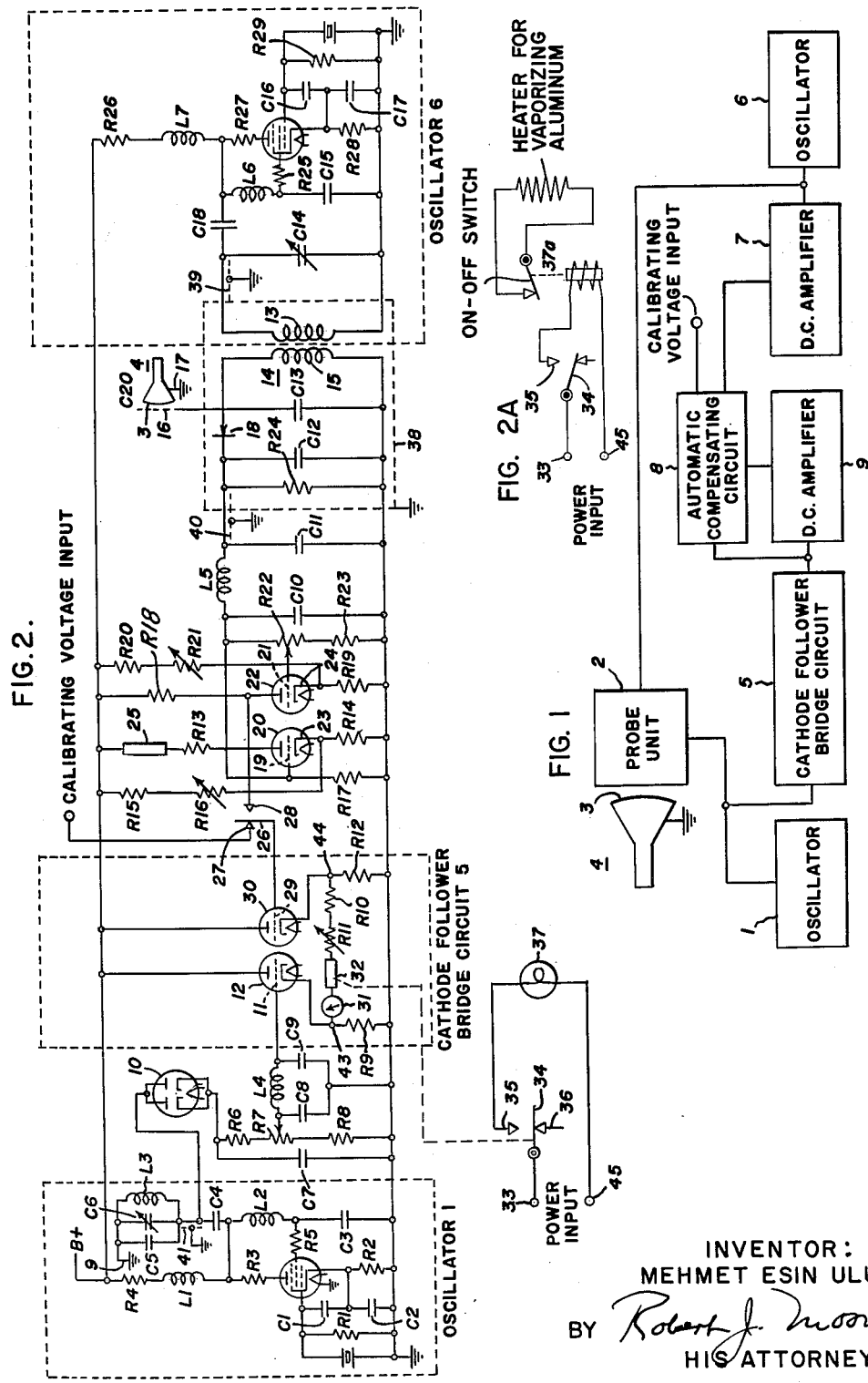
INVENTOR:
MEHMET ESIN ULUG,
BY Robert J. Mooney
HIS ATTORNEY.

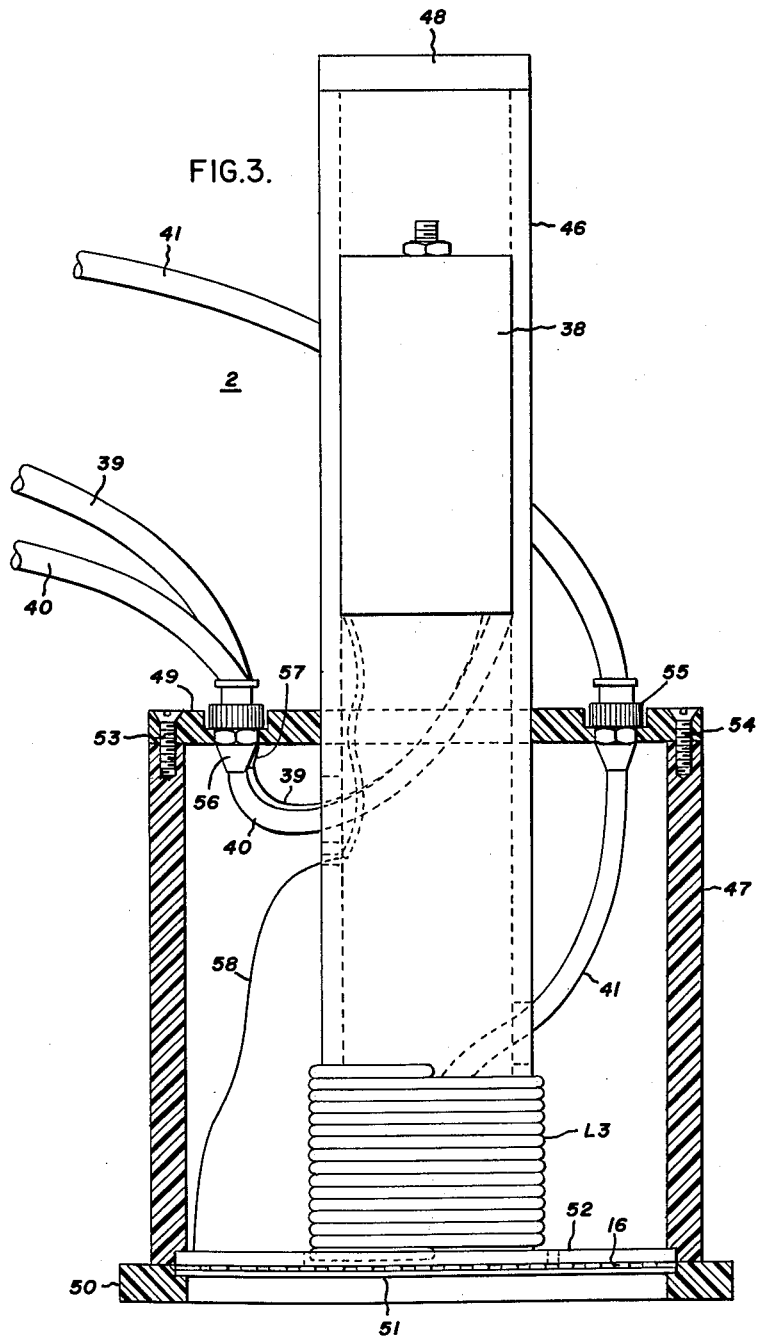

Feb. 19, 1963 M. E. ULUG 3,077,858
APPARATUS FOR CONTROLLING AND MEASURING THE THICKNESS
OF THIN ELECTRICALLY CONDUCTIVE FILMS
Filed March 17, 1960 3 Sheets-Sheet 3

INVENTOR:
MEHMET ESIN ULUG,
BY Robert J. Mooney
HIS ATTORNEY.

United States Patent Office 3,077,858
Patented Feb. 19, 1963

3,077,858
APPARATUS FOR CONTROLLING AND MEASURING THE THICKNESS OF THIN ELECTRICALLY CONDUCTIVE FILMS
Mehmet Esin Ulug, Toronto, Ontario, Canada, assignor to Canadian General Electric Company, Limited, Toronto, Ontario, Canada, a company of Canada
Filed Mar. 17, 1960, Ser. No. 15,739
18 Claims. (Cl. 118—7)

This invention relates to apparatus for measuring the thickness of a thin electrically conductive film formed on one side of a non-conducting base, such as a layer of dielectric material. This invention also relates to apparatus useful not only for measuring the thickness of a thin electrically conductive film formed on one side of a non-conducting base, but also for controlling the thickness of the conductive film.

While my invention is extremely useful in measuring and controlling the thickness of the aluminum film applied to the interior of cathode ray tubes and will be herein discussed in that particular connection, it is not intended that the scope of my invention should be limited thereto.

In most cathode ray tubes, especially those which do not employ an ion trap, it has been found necessary to coat the interior portion of the tube with a thin film of electrically conductive material. Aluminum has been widely used. The function of the aluminum film is three fold: to provide means whereby electrons can be removed rapidly from the fluorescent screen to thereby raise the screen potential and allow the electron beam to impinge on the screen with greater velocity, to reflect light by its mirror like properties, towards the observer instead of allowing otherwise useful light to be reflected backwards and lost in the interior of the tube, and in the case of cathode ray tubes having no ion trap, to prevent heavy ions from impinging on the fluorescent screen thereby causing "ion burn" and bright flashes of light on the screen. The thickness of the aluminum film is very critical. The film must be thin enough to allow unimpeded passage of the electron beam through it to the fluorescent screen, and thick enough to prevent the penetration of heavy ions.

It is obviously impossible to measure mechanically the thickness of an aluminum film of the order of 500-2000 A. deposited on the interior surface of a cathode ray tube. Even if the film were readily accessible, such as if it were deposited on one side of a plate of glass, mechanical measurement of such film thickness with any degree of accuracy would be impossible. In view of the foregoing, electronic aluminum thickness gauges have been devised. These prior art types of gauges generally operate on the same basic principle. A probe coil is provided and is placed on the glass tube face of a cathode ray tube. The coil is connected to an electronic oscillator and as the coil is moved over the tube face its Q varies in proportion to the resistance coupled into the coil circuit. Within limits, the resistance coupled into the coil circuit if a function of the thickness of the aluminum film, and the output current of the apparatus is therefore supposedly a function of the aluminum thickness. Indeed, if the thickness of the glass layer on which the aluminum film is deposited is uniform, typical prior art types of gauges generally provide reasonably accurate indications of aluminum thickness. If, however, as is generally the case, the thickness of the dielectric material varies, typical prior art types of gauges are of little or no use since no means are provided to compensate for dielectric thickness variations which result in incorrect indications. In other words, the output current or voltage of the type of gauges under consideration is not only a function of the thickness of the aluminum film, but also a function of the thickness of the dielectric layer on which the film is deposited. Mathematically, $I-f(X)+g(y)$ where $I$ is the output current of the prior art type of gauge, $f(X)$ and $g(y)$ are functions of $X$ and $y$, and $X$ and $y$ are the thicknesses of the conducting film and dielectric respectively. Obviously, if $y$ is a constant, prior art types of gauges provide output currents which are a function of the aluminum thickness since $g(y)$ is also a constant. As previously noted, however, the dielectric thickness $y$ is not generally constant, and therefore the output current is a function of both film thickness and dielectric thickness. In particular, the glass faceplate thickness of a cathode ray tube is far from constant, and it can be shown that if the probe coil of a prior art type of aluminum thickness gauge is moved over the glass surface of cathode ray tube faceplate on the other surface of which there is known to be a uniformly deposited aluminum film, there will be an extensive variation in the indication of the gauge caused solely by variations in glass thickness. The inutility of such gauges is quite apparent.

It is not only very desirable to have apparatus which will accurately measure aluminum thickness, but also it is most desirable to have apparatus which will control the application of the aluminum film and maintain its thickness within allowable limits. Prior art types of gauges would be useless for such control because of the previously mentioned incorrect indications due to glass thickness variations.

Accordingly, it is an object of this invention to provide apparatus for measuring the thickness of a thin electrically conductive film formed on one side of a non-conducting base, the thickness of which may vary considerably.

It is another object of this invention to provide apparatus for controlling the thickness of a thin electrically conductive film being formed on one side of a layer of dielectric material, the thickness of which may vary considerably.

In brief, my invention comprises means adapted to provide a voltage which is representative of the thickness of both the thin electrically conductive film, and the dielectric base, means to provide a second voltage which is representative of the thickness of the dielectric base, such that changes in that part of the first voltage representative of the thickness of the dielectric base are substantially compensated by changes in the second voltage caused by the same dielectric base thickness variations, and means adapted to determine the difference between the first and second voltages.

Further objects and advantages of my invention will become apparent from the ensuing disclosure taken in conjunction with the drawings in which:

FIG. 1 shows a schematic block diagram of one embodiment of my invention;

FIG. 2 shows a detailed circuit diagram of an embodiment of my invention;

FIG. 2a shows a modification of a portion of FIG. 2.

FIG. 3 is a front elevation depicting a probe unit for use with my invention;

Figure 4:
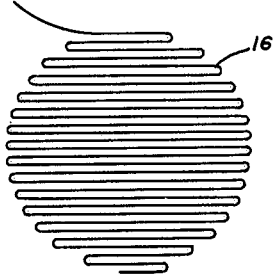
FIG. 4 shows a suitable probe grid structure for use in the probe unit of FIG. 3.

Referring now to FIG. 1, I have shown an oscillator 1 connected in the output circuit of which is a probe unit 2. Probe unit 2 may be moved over the faceplate 3 of cathode ray tube 4. Variations in the thickness of the aluminum film deposited on the interior surface of faceplate 3 of cathode ray tube 4 and variations in the thickness of glass faceplate 3 cause changes in the Q of a coil mounted in probe unit 2. An output representative of the thickness of both the aluminum film and glass faceplate 3 is thus fed into a cathode follower bridge circuit 5. A second oscillator 6 is also connected to probe unit 2. As probe unit 2 is moved over glass faceplate 3 of cathode ray tube 4, variations in capacitance between a probe grid located in probe unit 2 and the aluminum film, which is grounded through a lead connected to the anode button in the cathode ray tube, cause an output which is representative of the thickness of glass faceplate 3 to be fed into a D.C. amplifier 7. D.C. amplifier 7 and the automatic compensating circuit 8 are intrinsically related and provide an output to the cathode follower bridge circuit 5 which is representative of the thickness of glass faceplate 3. By means of D.C. amplifier 7 and automatic compensating circuit 8 the change in input to cathode follower bridge circuit 5 from automatic compensating circuit 8 caused by variations in the thickness of faceplate 3 is made exactly the same as that part of the change in the input from the side of oscillator 1 to cathode follower bridge circuit 5 which is caused by the same glass thickness variations. An indicator placed in the cathode follower bridge circuit thereby provides a reading which is directly proportional to aluminum thickness regardless of glass thickness variations. D.C. amplifier 9 is used for switching purposes to be hereinafter set forth.

In FIG. 2 I have shown a circuit diagram of one embodiment of my invention. In that figure, a probe coil L3 having a high Q is shunted by capacitors C5 and C6 to form a parallel resonant circuit. One side of the parallel resonant circuit is grounded at 9 and the other side is electron coupled in the plate circuit and forms part of a Miller-type crystal oscillator 1 which has high frequency stability characteristics. Such oscillators are well-known in the art and will not be described further. The output of oscillator 1 is connected to a rectifier circuit comprising diode 10 and the parallel combination of capacitor C7 with series connected resistors R6, R8 and potentiometer R7. Potentiometer R7 is connected to a low-pass filter comprising capacitors C8 and C9 and inductance L4. The output of the filter is applied to grid electrode 11 of a triode vacuum tube 12. The previously described circuitry may be called the measuring circuit.

What may be called the compensating circuit will now be described. Oscillator 6 is another Miller-type crystal oscillator. A resonant tank circuit comprising the primary coil 13 of air core transformer 14 and a variable capacitor C14 is electron coupled in the plate circuit and forms part of oscillator 6. The parallel combination of capacitor C13 and coil 15 form part of the secondary circuit of transformer 14. A Faraday shield or probe grid 16 is connected in the secondary circuit as shown thereby introducing a variable capacitance C20 between grid 16 and the aluminum film deposited on the interior surface of the faceplate 3 of cathode ray tube 4. The aluminum film is grounded at 17 by a ground connection to the anode button of cathode ray tube 4. It can be seen that capacitor C20 effectively shunts capacitor C13 and introduces into the secondary circuit of transformer 14 a capacitance which is variable in accordance with the distance between grid 16 and the aluminum film. The output of the secondary circuit is rectified in the rectifier circuit comprising rectifier 18 and the parallel combination of resistor R24 and capacitor C12 which in turn is connected to a low-pass filter comprising capacitors C10 and C11 and inductance L5. The output of the filter is applied to the grid electrode 19 of a triode 20 by means of resistor R17 and also to grid electrode 21 of triode 22 by means of potentiometer R22 and resistor R23. Triodes 20 and 22 and their associated circuitry form a pair of D.C. amplifiers. A pair of resistors R14 and R19 are connected to the cathodes 23 and 24 of triodes 20 and 22 respectively. Variable bias is supplied to triodes 20 and 22 by resistors R15 and R20 and variable resistors R16 and R21. The plate electrode of triode 20 is connected to B+ through a plate supply resistor R13 and relay 25. The plate electrode of triode 22 is connected to B+ through plate supply resistor R18. Relay 25 operates contact arm 26 which contacts either terminal 27 or terminal 28. Terminal 27 is connected to a unidirection calibrating input voltage. Terminal 28 is connected to the plate electrode circuit of triode 22. Contact arm 26 is connected to grid electrode 29 of a triode 30.

The cathode follower bridge circuit 5, which performs the function of indicating and/or controlling, comprises triodes 12 and 30 and associated circuitry. The plate electrodes of triodes 12 and 30 are directly connected to B+. Equal resistors R9 and R12 are connected in the cathode circuit. The upper terminals of the resistors are connected through a milliammeter 31, a relay 32, a calibrating resistor R11 and a current limiting resistor R10.

Terminals 33 and 45 are the power input terminals to a control circuit, visual indicating circuit or the like. Contact arm 34 is operated by relay 32 to contact either terminals 35 or 36. Terminals 45 and 35 are connected to a lamp 37, but may be connected to means to control the apparatus which is applying the aluminum film to the interior of cathode ray tube 4. For example, the circuit may be modified as shown in FIG. 2a to substitute an on-off switch represented at 37a for controlling the machine for applying the aluminum film. This may be in the form of a heater for vaporizing aluminum in a manner well known in the art.

As shown in FIG. 2, a common B+ is used for all vacuum tubes. The B+ may be derived from any suitable regulated power supply. Ground connections are made as shown.

As will be further described hereinafter, probe coil L3 and probe grid or Faraday shield 16 are mounted in a single probe unit 2 (FIG. 3). The numeral 38 is used to designate a grounded shielding can and contains components 13, 15, 18, C12, C13 and R24. Can 38 is also mounted in probe unit 2. As shown in FIGS. 2 and 3 the input and output connections into can 38 are made by grounded shielded cables 39 and 40. A shielded grounded cable 41 is also used in connection with probe coil L3.

FIG. 3 shows the construction of a suitable probe unit 2 for use with my invention. In FIG. 3, 38 is the grounded shielding can schematically shown in FIG. 2. L3 is the probe coil and 16 is the Faraday shield or probe grid. 39, 40 and 41 designated the shielded grounded cables schematically shown in FIG. 2. The main body of probe unit 2 may be constructed of a suitable dielectric material such as acrylic plastic.

The operation of the embodiment of my invention shown in FIG. 2 will now be described with particular reference to that figure.

In operation, the tuned circuit comprising capacitors C5 and C6 and probe coil L3 is tuned to resonance by variable capacitor C6. It is to be understood that probe coil L3 should have a high Q value at the frequency of operation. A Q of the order of 150 is suitable, but in general the higher the Q the more sensitive the measurement. Probe unit 2 is moved over faceplate 3 of cathode ray tube 4. The resistance of the aluminum film deposited on the interior surface of faceplate 3 is coupled into the tuned circuit and lowers the Q value of the coil. Since the magnitude of the resistance coupled into the tuned circuit is proportional to the thickness of the aluminum, the variations in the Q of coil L3 are representative of the thickness of the aluminum film. Another factor must be considered, however. The Q of the coil also varies in accordance with the thickness of glass faceplate 3. If there were no variation in glass thickness the Q of the coil would at all times be solely representative of the aluminum thickness. If, however, as is generally the case, the glass thickness varies, the Q of the coil is representative of both the glass thickness and the aluminum thickness. Mathematically $$Q = f(X) \text{ and } g(y) \qquad (1)$$

where $f(X)$ and $g(y)$ are functions of $X$ and $y$, which are respectively the aluminum thickness and the glass thickness. As the Q factor of probe coil L3 is reduced, the voltage output from oscillator 1 is reduced in direct proportion. Mathematically $$V = KQ \qquad (2)$$

where V is the voltage output of oscillator 1, K is a constant of proportionality and Q is the Q factor of coil L3. Substituting Equation 2 in Equation 1, the equation, $$V = K[f(X) + g(y)] \qquad (3)$$

is obtained. Equation 3 may be rewritten as $$V = f'(X) + g'(y) \qquad (4)$$

where $f'(X)$ and $g'(y)$ are functions of X and y equal respectively to $Kf(X)$ and $Kg(y)$.

The output of oscillator 1 is rectified by the circuit comprising diode 10 and capacitor C7, resistors R6 and R8 and potentiometer R7. Potentiometer R7 can be varied to increase or decrease the D.C. output from the rectifier circuit. The rectifier circuit output is filtered by a low-pass filter comprising capacitors C8 and C9 and inductance L4. The filter output voltage is then applied to grid 11 of triode 12. The voltage that is applied to grid 11 may therefore be expressed as $$V_1 = f''(X) + g''(y) \qquad (5)$$

where $f''(X)$ and $g''(y)$ equal $K_1 f'(X)$ and $K_1 g'(y)$ respectively. $K_1$, it will be understood, is simply a constant to take care of the effects of rectification and voltage division. Thus the voltage which is applied to grid 11 is representative of both the aluminum thickness and the glass thickness.

Figure 5:
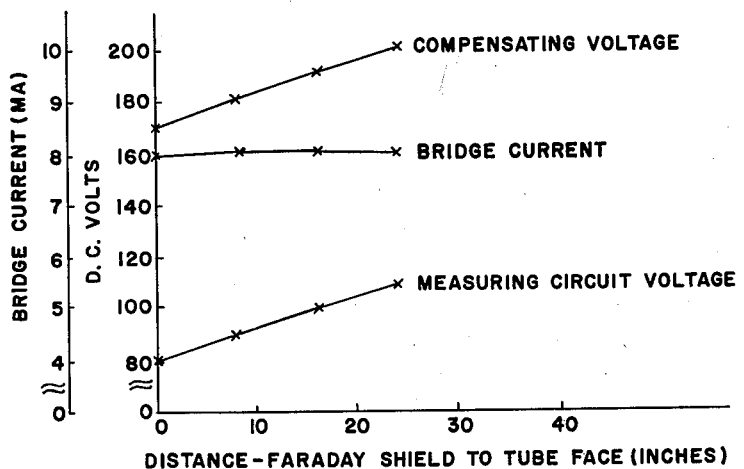
FIG. 5 is a graph showing the relation between compensating voltage, measuring circuit voltage, bridge current and distance.

The voltage applied to grid 11 controls the plate current of triode 12 and a voltage is developed across resistor R9 of the same general form as Equation 5. In other words the voltage across resistor R9 is representative of both aluminum thickness and glass thickness. The voltage applied to grid 11 is shown in FIG. 5. It can be seen that this voltage is very closely a linear function of the aluminum and glass thickness.

The basic function of the compensating circuit is to produce a voltage $$V_2 = g''(y) \qquad (6)$$

on grid 29 of triode 30. In other words, the compensating circuit must produce a voltage on grid 29 the variations of which due to varying glass thickness are equal to the variations of that part of the voltage applied to grid 11 of triode 12 caused by the same glass thickness variations. The operation of the compensating circuit to achieve this result will now be described.

Figure 6:
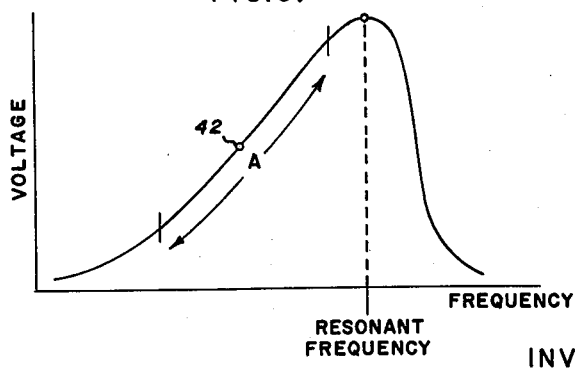
FIG. 6 depicts the characteristic of oscillator 2 shown in FIG. 2.

The tuned circuit comprising primary coil 13 of transformer 14 and variable capacitor C14 is detuned from resonance to a point where the voltage across the tuned circuit is approximately one half that when the circuit is in resonance. Detuning, of course, is achieved by varying capacitor C14. The tuned circuit is detuned approximately to the point 42 shown in FIG. 6 since operation must be confined to one side of the unsymmetrical resonance curve and not permitted to slip over the peak of the curve otherwise oscillation would cease as shown by the sharp fall off in voltage at frequencies above the resonant value. If an oscillator were used which had a symmetrical characteristic, operation would be permissible on either side of the curve but not over the peak. Operation on the high frequency side of a symmetrical resonance curve would necessitate, however, the addition of 180° phase shift circuit between oscillator 6 and grid 29 of triode 30 in order that the change in voltage on grid 29 be in the proper direction for correct compensation.

As probe unit 2 containing probe grid 16 is moved over the exterior surface of faceplate 3, the capacitance C20 between grid 16 and the aluminum film deposited on the interior surface of faceplate 3 of cathode ray tube 4 varies in accordance with the variations in thickness of the glass face plate which forms part of the dielectric of capacitor C20. Capacitor C20 effectively shunts capacitor C13 since the anode button of cathode ray tube 4 is connected to both the aluminum film and ground at 17. Variations in capacitor C20 detune the secondary circuit of transformer 14 and also affect the primary tuned circuit. The net result is that the output voltage of the secondary circuit is representative of the value of capacitor C20 which in itself is proportional to the thickness of glass faceplate 3 since $$C \propto \frac{1}{d}$$

where C is the capacitance and $d$ is the distance between the plates of the capacitor. The output voltage varies up and down along that portion of the curve designated by A in FIGURE 6. As the distance between the probe grid and the aluminum film increases (due to a glass thickness variation), the secondary voltage output decreases.

The output of the secondary circuit is rectified by the circuit comprising diode 18, resistor R24 and capacitor C12. The rectified output is applied to a low-pass filter comprising capacitors C10 and C11 and inductance L5. The filtered D.C. output is then applied to grids 19 and 21 of triodes 20 and 22 respectively.

As noted previously, the output voltage of the secondary circuit is a function of the glass thickness of faceplate 3, and therefore the D.C. input voltage on grids 19 and 21 is also a function of glass thickness. Mathematically $$V_3 = g_2(y) \qquad (7)$$

where $V_3$ is the D.C. voltage on grid 21 and $g_2(y)$ is a function of y, y being the glass thickness.

It is the purpose of triode 22, which with its associated circuitry is a D.C. amplifier, to provide a D.C. voltage on grid 29 of triode 30 which may be expressed mathematically as $$V_2 = g''(y) \qquad (6)$$

This result may be achieved by varying potentiometer R22 which controls the magnitude of the change in D.C. input voltage on grid 21 for a given change in glass thickness, and by adjusting variable resistor R21 which controls the bias. Potentiometer R22 and resistor R21 can be adjusted so that the change in output voltage from the D.C. amplifier, i.e. the input voltage to grid 29, when contact arm 26 touches terminal 28, caused by variations in the glass thickness of faceplate 3 is exactly the same as the change in that part of the input voltage to grid 11 caused by the same glass thickness variations. Mathematically, the D.C. voltage on grid 29 can, by the previously noted adjustment, be represented by $$V_2 = g''(y) \qquad (6)$$

The voltage on grid 11, on the other hand is given by $$V_1 = f''(X) + g''(y) \qquad (5)$$

Assuming contact arm 26 to be closed on terminal 28 as will be hereinafter discussed, the cathode follower bridge circuit 5 operates in such a manner as to effectively subtract the voltage applied to grid 29 of triode 30 from the voltage applied to grid 11 of triode 12. The voltage across resistor R9 may be expressed as $$V_4 = K_4[f''(X) + g''(y)] \qquad (7)$$

where $K_4$ is a constant, and the voltage across resistor R12 may be expressed as V $$V_5 = K_4[g''(y)] \qquad (8)$$

since triodes 12 and 30 are identical as are resistors R9 and R12. Therefore the difference in potential between points 43 and 44 is equal to $K_4[f''(X)]$. In other words the difference in potential between points 43 and 44 is directly proportional to the thickness of the aluminum film. A milliammeter 31 connected between points 43 and 44 will therefore provide indications directly proportional to aluminum thickness, and may be calibrated directly in terms of aluminum thickness. Variable resistor R11 is used to vary the sensitivity of meter 31 and resistor R10 is simply a current limiting resistor.

Relay 32 is used to control contact arm 34. The relay contracts and spring tension can be adjusted so that for any value of current flowing between points 43 and 44, and therefore for any value of aluminum thickness, contact arm 34 will close on terminal 35 to turn on light 37. It should be particularly noted that light 37 may be replaced by a control mechanism, such as an on-off switch 37a as shown in FIG. 2a, to actually control the machine applying the aluminum film and shut it off when a predetermined thickness of alumnium has been applied to the interior surface of cathode ray tube 4.

A second D.C. amplifier comprising triode 20 and its associated circuitry is used to effect automatic switching. When meter 31 is being calibrated and no compensation is being used, grid 29 of triode 30 is connected to a D.C. calibrating voltage source through terminal 27 and contact arm 26. In this case the current passing through relay 25 is of such a magnitude to maintain contact arm 26 connected to terminal 27. However, when probe unit 2 is placed on faceplate 3 of cathode ray tube 4, the voltage applied to grid 19 of triode 20 changes as previously discussed and varies the conduction of triode 20 so that relay 25 causes contact arm 26 to contact terminal 28 thereby applying the compensating voltage $V_2 = g''(y)$ to grid 29 of triode 30.

FIGURE 5 is a graph showing the compensating voltage applied to grid 29, the measuring circuit voltage applied to grid 11 and the bridge current between points 43 and 44 against the distance from the Faraday shield 16 to the tube face. The plots were obtained by inserting pieces of glass between the tube face 3 and the probe unit 2 to gradually build up the glass thickness. The probe unit 2 was not moved laterally on the tube face however, and therefor there was no actual variation in the thickness of the aluminum film. Note that the bridge current remained very closely constant as the glass thickness was increased.

It has been found that 2 megacycles is one suitable frequency for oscillator 1 while 5 megacycles is a suitable complementary frequency for oscillator 6. An operative thickness gauge constructed according to the embodiment of my invention illustrated in FIG. 2 has been constructed and accurately compensates for glass thickness variations of as much as ±¼ inch.

*Calibration of the Apparatus*

In calibrating the apparatus, probe unit 2 is placed on a slab of non-conductive material and meter 31 is zeroed by varying potentiometer R7. Since there is no capacitance between probe grid 16 and the slab of non-conductive material, the compensating circuit is inoperative and relay 25 maintains arm 26 in contact with terminal 27 and a source of D.C. calibrating voltage input. The meter 31 is obviously zeroed when potentiometer R7 is adjusted so that the voltage on grid 11 equals the calibrating voltage input on grid 29. Probe unit 2 is then placed directly on a sheet of aluminum at least greater in thickness than the maximum allowable aluminum film thickness and meter 31 is set for full scale deflection by variable resistor R11. The compensating circuit is still not yet connected to grid 29. Probe unit 2 is then placed on the center part of faceplate 3 of cathode ray tube 4 and a reading, say A, on meter 31 is obtained. This last reading should be read when no compensation is being used, so it is necessary to prevent contact arm 26 from switching to terminal 28 as it will do as soon as probe unit 2 is in proximity to faceplate 3 of cathode ray tube 4. This may be achieved by disconnecting the ground connection to the anode button of the cathode ray tube. For the remainder of the calibrating process, compensation is used, i.e. the ground lead is reconnected. Probe unit 2 is placed on the center part of faceplate 3 and meter 31 is made to read A again, but this time with compensation. Pieces of glass are added between probe unit 2 and faceplate 3, but the probe unit is not moved laterally on faceplate 3. The apparatus must be adjusted so that no deflection of meter 31 takes place. The controls for the latter two adjustments are potentiometer R22, variable resistor R21 and variable capacitor C14.

Once meter 31 has been calibrated in the aforementioned manner, probe unit 2 may be moved over faceplate 3 and the current indicated by meter 31 is directly proportional to the aluminum thickness. Meter variations then indicate relative aluminum thickness.

If it is desired that meter 31 be calibrated directly in units of thickness, the following method may be used. All the previous steps are repeated. Thin uniform aluminum films of varying thicknesses are formed by conventional methods on glass plates comparable in thickness to the faceplate thickness of a cathode ray tube. Probe unit 2 is then placed on the glass surface of each plate and the meter reading noted. Each aluminum film may then be etched off its glass plate and weighed. Since the length, width, weight and density of the film is known, the thickness may be easily calculated and the meter calibrated accordingly.

Since there are limits to the degree of variation of faceplate thickness which may be compensated, it is preferable that in the calibration operations previously described a "bogie tube" be used. In this particular instance a "bogie tube" is one in which the faceplate thickness, at least at the center of the tube, corresponds to the most probable value of the faceplate thickness of a number of cathode ray tubes. Thus by calibrating the apparatus using the most probable value of faceplate thickness, one insures that compensation will be effective both for thicknesses above and below the most probable thickness. On the other hand, if calibration were effected using tubes with much lower or higher than average faceplate thicknesses, compensation may not be effective over the whole range of values of possible thicknesses. As noted hereinafter use of the components listed will enable compensation for glass thicknesses of ±¼". Improving the linearity of the apparatus as known in the art would enable compensation for larger variations.

*Probe Unit*

As noted previously, probe unit 2 comprises both probe grid or Faraday shield 16 and probe coil L3. Since a good probe unit is essential for the correct operation of the embodiment of my invention hereinbefore described, I shall comment in some detail on the construction of the probe unit shown in FIG. 3 which has been successfully used with the embodiment of my invention shown in FIG. 2.

Probe unit 2 shown in FIG. 3 comprises two concentrically mounted cylinders 46 and 47 closed at their ends by discs 48, 49, 50 and 51. Disc 48 is circular in shape as is disc 51. Discs 50 and 49, however, are annular in shape to accommodate disc 51 and cylinder 46 respectively. Another disc 52 is mounted as shown and contains an annular trough to accommodate the bottom coil of probe coil L3. All parts 46 through 52 are made from acrylic plastic, and with the exception of the joint between disc 49 and cylinder 50 which is effected by means of screws 53 and 54, all plastic parts are assembled using chloroform.

Probe coil L3 is wound on cylinder 46 and consists of 16 turns of close wound #12 enameled copper wire. Probe coil L3 is connected in the plate circuit of oscillator 1 through shielded cable 41 and terminal 55.

Grounded can 38 contains the components R24, C12, C13 and transformer 14 shown in FIG. 2. The input and output connections to these components are made by shielded cables 39 and 40 and terminals 56 and 57. Shielded cables 39, 40 and 41 are, of course, used to minimize stray capacitance.

Probe grid 16 is sandwiched between discs 51 and 52 and is connected into the circuitry (see FIG. 2) by wire 58. As shown in FIG. 4, probe grid 16 is generally circular in shape, and in this particular embodiment comprises fifteen loops of #22 enamelled copper wire arranged to cover a circular area of 3¾" diameter. It is worthwhile noting that probe grid 16 should not be constructed in the form of a conductive mesh of screen since excessive loading is caused by current flow in the closed loops.

The basic dimensions of probe unit 2 are as follows:

Component:
  Cylinder 46 _____ 9" long, 1⅝" O.D., ⅛" walls.
  Cylinder 47 _____ 4" long, 4¼" O.D., ¼" walls.
  Discs 48, 49, 50 _____ ⅛" thick.
  Disc 51 _____ 1/16" thick.
  Disc 52 _____ ⅛" thick.

As shown in FIG. 3, probe grid 16 and probe coil L3 are symmetrically mounted about the same vertical axis. It is, of course, essential that probe grid 16 and probe coil L3 be mounted in such a configuration in order that the effects of each, in the circuit shown in FIG. 2, caused by moving probe unit 2 over faceplate 3 are a result of the same variations in glass thickness. If, for example, probe grid 16 and probe coil L3 were substantially laterally displaced from one another, the effects of each in the circuit would be based on probably different glass thicknesses, and, as a result, the compensation would be incorrect.

It is to be understood that the probe unit hereinbefore described in detail is to be in no way interpreted as limiting the scope of my invention.

*General*

Those skilled in the art will realize that while I have chosen to deal with unidirectional voltages and currents for measuring purposes, my invention is not limited thereto. While unidirectional currents and voltages are much to be preferred, my invention could also be constructed using alternating voltages and currents. It is to be noted, however, that the stability of measurement at high frequencies is not as good as at low frequencies and D.C., and moreover, the use of A.C. would require the construction of an expensive high frequency amplifier. It is also to be noted that in the end rectification of the A.C. is almost sure to be required in any case since almost all suitable high frequency A.C. measuring instruments rectify before measuring. The net effect would then be simply to place the rectification circuitry in a different part of the whole circuit.

Oscillator frequencies of 2 and 5 megacycles have been found particularly suitable for use in measuring the orders of aluminum thickness to be found on the interior of cathode ray tubes. Those skilled in the art will realize that greater thicknesses may be measured by decreasing the frequency of oscillation.

It can be seen that by my invention I have produced a gauge not only useful for accurately measuring the thickness of a thin conductive film deposited on a dielectric material of variable thickness, but also a gauge which can be used to accurately control the thickness of the thin conductive film as it is being deposited on the dielectric material.

What I claim as new and desire to secure by Letters Patent of the United States is:

1. In electrical apparatus for gauging the thickness of a thin electrically conductive film portion of a sandwich consisting of said film formed on a non-conductive base, first sensing means adapted to sense said sandwich and provide a first signal representative of the thickness of both said thin electrically conductive film and said non-conductive base, second sensing means adapted to sense said sandwich and provide a second signal representative of the thickness of said non-conductive base, and means adapted to determine the difference between said first and second signals to thereby produce a third signal representative solely of the thickness of said thin electrically conductive film.

2. Apparatus according to claim 1 further characterized by means adapted to indicate the magnitude of said third signal representative solely of the thickness of said thin electrically conductive film.

3. Apparatus according to claim 1 further characterized by means responsive to said third signal representative solely of the thickness of said thin electrically conductive film to control the thickness of said thin electrically conductive film as it is being deposited on said non-conductive base.

4. Apparatus according to claim 1 wherein said difference determining means comprises a cathode follower bridge circuit.

5. In electrical apparatus for gauging the thickness of a thin electrically conductive film portion of a sandwich consisting of said film formed on a non-conductive base, first sensing means adapted to sense said sandwich and provide a first unidirectional signal representative of the thickness of both said thin electrically conductive film and said non-conductive base, second sensing means adapted to sense said sandwich simultaneously with said first sensing means and provide a second unidirectional signal representative of the thickness of only said non-conductive base portion of said sandwich, and means adapted to determine the difference between said first and second signals to thereby produce a third signal representative solely of the thickness of said thin electrically conductive film.

6. In electrical apparatus for gauging the thickness of a thin electrically conductive film portion of a sandwich consisting of said film deposited on a non-conductive base, first sandwich sensing means adapted to provide a first signal representative of the thickness of both said thin electrically conductive film and said non-conductive base, means to rectify said first signal to thereby provide a second signal representative of the thickness of both said thin electrically conductive film and said non-conductive base, second sandwich sensing means adapted to provide a third signal representative of the thickness of said non-conductive base, means to rectify said third signal to produce a fourth signal representative of the thickness of said non-conductive base, means adapted to alter said fourth signal to produce a fifth signal representative of the thickness of said non-conductive base such that the variations in said fifth signal caused by variations in the thickness of said non-conductive base are substantially equal to the variations of that part of said second signal caused by the same variations in thickness of said non-conductive base, and means adapted to determine the difference between said second and fifth signals to thereby produce an output signal representative solely of the thickness of said thin electrically conductive film.

7. Apparatus according to claim 6 in which said means adapted to provide said first signal comprises a high frequency signal source containing an inductive probe in the output circuit thereof, and said means adapted to provide said third signal comprises a high frequency signal source containing a capacitive probe in the output circuit thereof.

8. Apparatus according to claim 6 further characterized by means adapted to indicate the magnitude of said output signal.

9. Apparatus according to claim 6 further characterized by means adapted to utilize said output signal to control the thickness of said thin electrically conductive film while it is being deposited on said non-conductive base.

10. Apparatus according to claim 6 wherein said means adapted to alter said fourth signal comprises a D.C. amplifier.

11. Apparatus according to claim 6 further characterized by switching means adapted to apply a constant unidirectional signal to said difference determining means in place of said fifth signal when no compensation is desired and adapted to apply said fifth signal to said difference determining means when compensation is desired.

12. Apparatus according to claim 6 wherein said means adapted to alter said fourth signal comprises a D.C. amplifier, said apparatus being further characterized by means adapted to indicate the magnitude of said output signal.

13. Apparatus according to claim 6 wherein said means adapted to alter said fourth signal comprises a D.C. amplifier, said apparatus being further characterized by means adapted to utilize said output signal to control the thickness of said thin electrically conductive film while it is being deposited on said non-conductive base.

14. Apparatus according to claim 6 wherein said means adapted to alter said fourth signal comprises a D.C. amplifier, said apparatus being further characterized by switching means adapted to apply a constant unidirectional signal to said difference determining means in place of said fifth signal when no compensation is desired and adapted to apply said fifth signal to said difference determining means when compensation is desired, and means adapted to indicate the magnitude of said output signal.

15. Apparatus according to claim 6 wherein said means adapted to alter said fourth signal comprises a D.C. amplifier, said apparatus being further characterized by switching means adapted to apply a constant unidirectional signal to said difference determining means in place of said fifth signal when no compensation is desired and adapted to apply said fifth signal to said difference determining means when compensation is desired, and means adapted to utilize said output signal to control the thickness of said thin electrically conductive film while it is being deposited on said non-conductive base.

16. Apparatus according to claim 6 wherein said difference determining means comprises a cathode follower bridge circuit.

17. Apparatus according to claim 6 wherein said means adapted to alter said fourth signal comprises a D.C. amplifier, said difference determining means comprises a cathode follower bridge circuit, said apparatus being further characterized by switching means adapted to automatically apply a constant unidirectional signal to said difference determining means in place of said fifth signal when no compensation is desired and adapted to automatically apply said fifth signal to said difference determining means when compensation is desired, and means adapted to indicate the magnitude of said output signal.

18. Apparatus according to claim 6 wherein said means adapted to alter said fourth signal comprises a D.C. amplifier, said difference determining means comprises a cathode follower bridge circuit, said apparatus being further characterized by switching means adapted to automatically apply a constant unidirectional signal to said difference determining means in place of said fifth signal when no compensation is desired and adapted to automatically apply said fifth signal to said difference determining means when compensation is desired, and means adapted to utilize said output signal to control the thickness of said thin electrically conductive film while it is being deposited on said non-conductive base.

References Cited in the file of this patent

UNITED STATES PATENTS

| | | |
|---|---|---|
| 2,793,345 | Hags | May 21, 1957 |
| 2,806,204 | Rothacker | Sept. 10, 1957 |